(12) United States Patent
Brosnan et al.

(10) Patent No.: US 6,548,438 B2
(45) Date of Patent: Apr. 15, 2003

(54) METHOD FOR PROCESSING CLAY CERAMIC MATERIALS

(75) Inventors: Denis A. Brosnan, Clemson, SC (US); James C. Frederic, Jr., Greenwood, SC (US); John P. Sanders, III, Piedmont, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 09/901,167

(22) Filed: Jul. 9, 2001

(65) Prior Publication Data

US 2003/0013599 A1 Jan. 16, 2003

(51) Int. Cl.$^7$ .......................... C04B 33/04; C09C 1/40; C09C 1/42; C09C 3/00; C09C 3/08
(52) U.S. Cl. .................. 501/141; 501/145; 501/146; 501/147; 501/148
(58) Field of Search ................. 501/141, 145, 501/147, 148, 146; 106/486, 468, 487; 264/680; 252/186.21, 186.22, 186.23, 186.43, 186.42, 186.44, 187.28, 187.31, 187.23

(56) References Cited

U.S. PATENT DOCUMENTS 3,853,983 A * 12/1974 Abercrombie, Jr. et al. 209/214
3,961,971 A *  6/1976 Abercrombie, Jr. et al. 423/113
5,397,754 A *  3/1995 Iannicelli et al. ........... 106/486

OTHER PUBLICATIONS

Gilbert C. Robinson, A Primer On Efflorescence, Talk Presented at The American Ceramic Society Convention, May 1995.
Wayne E. Brownell, Efflorescence Resulting from Pyrite in Clay Raw Materials Reprinted from The Journal of The American Ceramic Society, vol. 41, No. 7., Jul. 1958.
Wayne E. Brownell, Efflorescence Resulting from Sulfates in Clay Raw Materials, Department of Ceramic Research, State of University of New York College of Ceramics at Alfred University, Alfred, New York.. pp. 310–314. Aug. 1958.
Hansgeorg Ratzenberger, The Influence of the mineralogical composition of structural ceramics and heavy clay materials on kiln scumming and efflorescence, Reprinted from Silikattechnik 38 (1987) No. 8 (no month).
A.C. Banerjee, Premalatha Rangaswamy, Sandhya Sood, Mechanism of Oxidation of Iron Pyrite in Dynamic Air, Thermal Analysis, ICTA 80, Birkhaeuser Verlag, Basel Boston Stuttgart pp. 241–246 (no date).
Hartmut Jost, Michael Braun, A study of the formation of efflorescent salts, Ziegelindustrie International 5/86, pp. 270–276.
Hartmut Jost, Michael Braun, A study of the formation of efflorescent salts, Part 2, Ziegelindustrie International 11/86, pp. 574–577.
Abstract of Presentation entitled "Internal Oxidation of Organics in Shale", ACS Meeting, May 1, 1984, J.K. Cochran.
International Search Report for PCT/US02/19936 filed Jun. 24, 2002.

* cited by examiner

Primary Examiner—Michael Marcheschi
(74) Attorney, Agent, or Firm—Dority & Manning

(57) ABSTRACT

A method of forming bricks, tiles, and the like by treating clay, shale or other clay ceramic raw materials containing pyrite is disclosed. Such clay, ceramic raw materials may be ground, and then mixed with an oxidizer in a pre-oxidation step to disperse the oxidizer within the clay to expose the maximum amount of clay surface to the oxidizer. One oxidizer that may be used is an aqueous solution of hydrogen peroxide. Clay is shaped into clay products and then heated to elevated temperatures. Pyrite within the clay is oxidized, thereby removing sulfur-containing compounds such as sulfur dioxide from the clay. The application of the invention may assist in preventing efflorescense by ensuring complete or nearly complete removal of pyrite from products oxidation treatment and subsequent firing at elevated temperatures. Similarly, by enhancing the oxidation of pyrite, faster firing cycles may be possible which facilitates reduced fuel consumption and faster process time.

20 Claims, 1 Drawing Sheet

METHOD FOR PROCESSING CLAY CERAMIC MATERIALS

FIELD OF THE INVENTION

The invention relates to methods for processing clays, shales and other similar clay ceramic materials containing natural sulfide contaminants, such as pyrite. In particular, the invention relates to improved methods for removing such contaminants from clay products.

BACKGROUND OF THE INVENTION

Natural clays and other materials that are mined for the production of bricks, tiles, and ceramic products may contain natural sulfides. Such sulfides may include pyrite, also known as iron sulfide $FeS_2$. Sulfur-containing compounds such as pyrite are typically removed from ceramic and brick products during manufacture by thermal treatment during firing of the product. This treatment requires special cycles and extended process times, and typically generates acid gas emissions from the kiln.

Acid gasses such as sulfur dioxide (i.e.: $SO_2$), sulfur trioxide (ie: $SO_3$) or sulfuric acid (i.e: $H_2SO_4$) can be produced in the kiln, although sulfur dioxide appears to be the most common product of sulfide oxidation. If these sulfur-containing compounds (i.e. contaminants) are not driven from the products during firing, surface defects such as efflorescence may occur in the products at a later date.

Brick and other structural clay products such as quarry tile and roofing tile are nearly 100 percent clay content. Such materials have the characteristics of plasticity, and offer and a reasonable firing range temperature. The majority of brick made in North America are produced by stiff extrusion, followed by drying and firing. The firing step of brick production generally includes processing temperatures in the "red heat" range of 950–1250° C. The products are heated to such temperatures on a predetermined schedule.

There has been a need in the industry to provide a manufacturing method which can reduce undesirable efflorescence. Efflorescence may be described as an undesirable deposit or "blooming out" of substances from the interior onto the surface of masonry or brick which discolors the surface and detracts from the appearance of the structure. Efflorescence substances may comprise salts, acid, bases or colloidal gels.

In the past, techniques reducing the effects of efflorescence in making ceramic products have included maintaining a kiln temperature of about 1000° C. and flooding with oxygen to completely oxidize the clay during firing. However, such firing for extended periods of time, and elevated temperatures, is time consuming and expends a significant amount of energy.

Sulfur dioxide ($SO_2$) is known as a "criteria pollutant" that is subject to regulation by state and federal environmental authorities. During thermal processing or "firing", all of the $SO_2$ released due to oxidation is not immediately released. In fact, the clay holds some as "sulfate" like phases with further liberation occurring during a soak period. In general, it has been shown that once the residual sulfur content in a fired brick reaches a characteristic threshold, then sulfuric acid will form in the brick once it is in a wall in a sufficient concentration to cause undesirable efflorescence. Thus, it is important to remove sulfur-containing compounds from brick during the brickmaking process.

One of the disadvantages of conventional ceramic processes is that they require large amounts of energy to maintain sufficiently high temperatures for a sufficient length of time in order to completely remove sulfur-containing compounds from the brick. Most processes require fairly extended process times, and many brickmaking processes lead to the emission of undesirable acid gasses, such as sulfur dioxide in the kiln.

What is needed in the industry is a method to effectively remove sulfur-containing contaminants by firing with reduced processing times, resulting in energy savings and enhanced output. A method that would facilitate removal or degradation of sulfur-containing compounds from such products prior to firing in the kiln may result in cleaner emissions from the kiln exhaust. Thus, a method that is capable of reducing the incidence of efflorescence in clay products and masonry by ensuring complete removal of pyrite from the product in a more effective manner would be highly desirable.

SUMMARY OF THE INVENTION

A method of treating clay, shale and other ceramic materials containing pyrite is provided in the invention. In the manufacture of brick, the particle size of mined clay, shale or other ceramic raw material is reduced. For purposes of this description, "clay" shall refer to clay, shales, and other natural or synthetic brickmaking material. Then, the clay is mixed with an oxidizer to disperse the oxidizer within the clay to expose the maximum amount of clay surface to the oxidizer. The clay is shaped into clay products (i.e.: bricks, tiles or the like) and heated to elevated temperatures. The pyrite within the clay is oxidized by the action of the oxidizer, thereby removing sulfur-containing compounds from the clay. The application of the invention may assist in preventing efflorescense by ensuring complete or nearly complete removal of pyrite from the product through the combination of oxidation treatment and subsequent firing.

Many different oxidizers may be employed in the practice of the invention, as further provided in the description below. In one preferred application of the invention, the oxidizer employed comprises a solution of hydrogen peroxide. In other embodiments, an optional step of aging the clay in air is provided.

BRIEF DESCRIPTION OF THE FIGURE

A full and enabling disclosure of this invention, including the best mode shown to one of ordinary skill in the art, is set forth in this specification. The following Figure illustrates the invention.

DETAILED DESCRIPTION OF THE INVENTION

Figure 1:
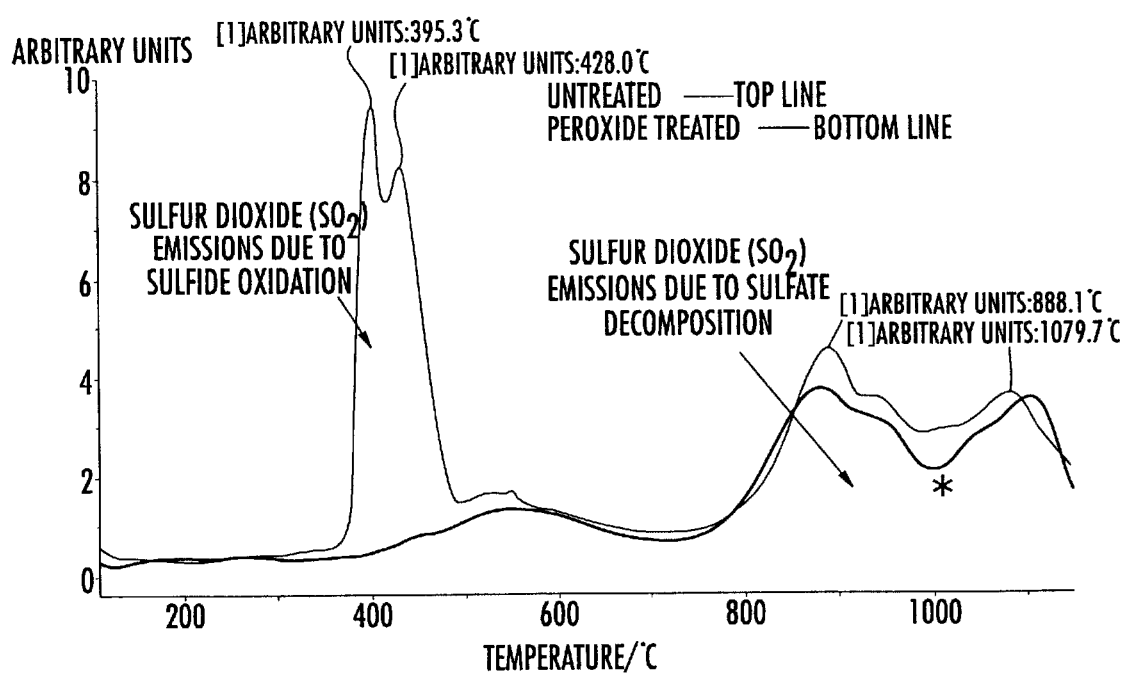
FIG. 1 is a graph showing temperature versus emission for decomposition comparing peroxide treated materials to materials that were untreated by oxidizing agent.

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

Traditionally, ceramic products comprise alumino-silicate ceramics. Clays contain minerals with alumina ($Al_2O_3$) and silica ($SiO_2$) in their composition along with various other trace components. These materials vitrify to form a significant amount of glass at temperatures exceeding about 950° C. Clays that are used include kaolin, ball clay, shale, illite, and montmorillonite. Non-clay minerals such as chlorites also may include a major part of the raw material. Other constituents of traditional ceramic batches may include minerals such as potter's flint (ground silica), feldspar (sodium or potassium aluminosilicate), pyrophyllite (alumino-silicate), talc (magnesium alumino-silicate), and wollastonite (calcium silicate).

Three processes used in forming traditional ceramic products by powder processing methods include: (a) slurry processing (slip casting), (b) plastic forming (extrusion and plastic molding, etc.) and (c) dry pressing. Each forming process is preceded by powder preparation steps and followed by drying and firing steps.

Slip casting involves preparation of slurries in a mixer called a "blunger". The slurry is charged to molds that, by suction, draws the slurry to the mold surface to form a cake of the product shape. When sufficient wall thickness is obtained, the mold is drained. When the product has dewatered sufficiently to realize enough strength to be physically handled, it is removed from the mold to for drying and firing. "Pressure casting" involves subjecting a slurry to an external pressure to accelerate the development of the cake against a porous mold.

Plastic forming involves the additional of water to a powdered raw material mixture such that the material develops plasticity and cohesion. Plasticity in ceramic powders is generally defined as the characteristic property of moist powders which permits them to be deformed without cracking and retain a new shape when the deforming stress is removed. The amount of plasticity developed depends upon the ware (i.e. product), the moisture content of the mixture and the inherent plasticity of the raw materials. The plasticity can also be enhanced by the addition of organic binders or other additives.

For extrusion processes, crushed and screened clay is mixed with water in a continuous mixer known as a "pugmill". The clay is sent to an extrusion machine that typically includes a vacuum-de-airing chamber. Clay is forced through a die to form the desired shapes. The die may contain internal elements to produce a cored (partially hollow) shape. Both petroleum-based and waterbased die lubricants may be employed.

In producing molded products, brick are made by machines (presses) which "throw" or insert plastic clay slugs into multiple cavities in mold boxes followed by compaction at low pressures (typically <40 MPa). The molds may be coated with sand or water to facilitate release from the mold (producing sand or water "struck" brick respectively). The bricks are placed on trays and conveyed to the dryer.

In many structural clay products, the surface is coated with wet or dry powders to create specific colors or textures. These powders are typically mixtures of clay and colorants. Various sands may be used to create certain colors or textures.

In extrusion, the product may be cut into slugs of a convenient length, and then further cut into brick using reel or push through cutters. The product is then loaded on kiln cars for drying and firing. Many new plants use industrial robots to stack brick on the kiln cars.

In the case of roofing tile, cut slugs of plastic clay are fed to a press for molding of the final shape. The pressed shapes may be loaded onto ceramic supports and further loaded upon cars for passage through the dryer and kiln.

Dryers used with traditional ceramic products are typically fed by waste heat drawn from the cooling zone of the kiln. Convection is the dominant heat transfer mechanism employed in such dryers, and the product typically moves in a direction opposite to the movement of air in the dryer.

The dryer maintains a temperature and relative humidity profile designed to minimize the rate of drying during the critical shrinkage period for the product (Stage I). Excessive drying rates may undesirably result in cracking of the product. The entrance end of dryers where product is inserted typically are held at a specified relative humidity and low temperature (typically 50° C. or higher) while the exit end condition of the dryer is at high temperature (typically >175° C.). The dryer exhaust air exits near the product entrance end through a port. Some drying may be accomplished within a plant building during the dwell period between extrusion location, and the entrance to the dryer. Special areas called "holding rooms" may be used to accomplish such pre-drying, and in some processes, a substantial amount of water is removed in pre-drying.

Oxidation of Pyrites

In manufacturing ceramic products, primary pollutant species include fugitive emissions of particulate matter (in raw material preparation), emissions of hazardous air pollutants (HAP's), and emissions of criteria pollutants (species listed in the national Ambient Air Quality Standards). The gaseous pollutants typically originate from the firing process. One criteria pollutant that may be emitted is $SO_x$, which is a generic term for sulfur and oxygen species such as $SO_2$ or $SO_3$. Trace quantities of volatile organic compounds (VOC's) and metals (in the form of metal oxides) also may be emitted.

Emissions of $SO_x$ usually are due to decomposition of pyrite or sulfates in the clay. White body compositions usually do not contain pyrite, as the iron oxide formed upon oxidation may cause iron spotting. Pyrite is usually associated with products made form sources of shale and or fireclay. The decomposition of pyrite has been shown to proceed through two steps, with the initial oxidation occurring at about 400° C. and subsequent oxidation continuing up to about 600° C. Some sulfur species are held in the ceramic body to be released gradually as temperatures are increased in the kiln.

The prevalent salt in brick making is pyrite or iron sulfide, i.e. $FeS_2$ Pyrite is linked to "sulfur efforescence". The oxidation of pyrite occurs in two steps:

Step 1: $FeS_2+O_2=FeS+SO_2$ (pyrite within brick plus air yields FeS plus sulfur dioxide)

Step 2: $2\ FeS++7/2\ O_2=Fe_2O_3+2\ SO_2$ (FeS plus air yields red iron oxide plus sulfur dioxide)

Several different oxidizing agents may be used in the practice of the invention to convert the sulfur in pyrite to sulfur dioxide. One oxidizing agent that may be employed is an aqueous solution of hydrogen peroxide ($H_2O_2$). For example, a solution having about 3% by weight hydrogen peroxide has been found to be very beneficial as an oxidizer.

Other oxidizing agents that may be employed in the practice of the invention to oxidize pyrites include: barium nitrate, potassium nitrate, sodium nitrate, potassium chlorate, ammonium perchlorate, magnesium perchlorate, calcium hypochlorite, sodium chlorite, barium peroxide, sodium peroxide, sodium percarbonate, sodium perborate, lithium aluminum hydride, calcium hydride, sodium hydride, organic acids, citric acid, ammonium phosphate, borax, water, and ozone.

Ceramic Product Manufacturing

In the manufacture of ceramics, such as brick, mined clay is transported to a plant site and stored under a shed or covered building. The material may be stored from a few days to several months prior to use.

For purposes of this disclosure, it should be understood that clays, shales, and other materials from the earth may be used in making products pursuant to the invention. However, for simplicity, all such materials shall collectively be described herein collectively as "clay" or "clay ceramic" for the purposes of this description. Products of the invention may include bricks, wall tile, roofing tile, pottery, and other ceramic-based finished products.

Raw mined clay is usually in an agglomerated state, and therefore requires size reduction such as crushing or grinding to make the clay usable. Typically, the clay will go through at least one crushing or grinding step, and then a screening step to remove oversized material.

The ground material is usually mixed with water to provide plasticity for forming. Additives or colorants may be added. For brickmaking processes, this stage commonly occurs in a pugmill. For pressing processes such as the production of tile, the ground material is agglomerated to improve flow characteristics, which provides for improved filling of the pressing die and higher quality. In some cases, glazes, coatings or surface textures are applied.

In general, products are dried by removing water prior to firing. The product is fired to densify the material and provide strength. Firing removes soluble species such as sulfates by either decomposing them (ie: emission of $SO_2$) or by incorporating them into the glassy phase of brick or to decrease the porosity of brick to a point at which the salts cannot be transported to the surface of the brick, thereby avoiding efflorescence.

In the practice of the invention, however, oxidation may take place at essentially any step prior to the formation of the product, depending on the particular process configuration. It is possible to optimize several variables which include the quantity of oxidizer needed to treat a particular quantity of clay, the sulfur content of the clay, the concentration of oxidizer solution employed, the particle size of the pyrite (i.e., dissolution kinetics), and the degree of mixing after peroxide treatment. By beginning the oxidizing process prior to the firing procedure, it is possible to provide for more efficient and effective removal of sulfur-containing contaminants.

The total sulfur content of a raw clay ceramic material may range from less than 0.1 weight percent to at least about 3 weight percent, or more. In the practice of the invention, it has been found that a solution of hydrogen peroxide (as one oxidizer) of between about 1% and 7% by weight may be employed advantageously. In one embodiment of the invention, a hydrogen peroxide solution having about 3% by weight may be used. Furthermore, other oxidizing agents can be employed in effective concentrations, and the chemical strength of the particular oxidizer will determine the amount of oxidizer that is needed for a given type of clay ceramic material having a particular sulfide content.

In some applications, it has been found that a 1:1 ratio of peroxide solution to clay, by weight, is sufficient to achieve good results. However, this ratio may be much higher than would be practical for many processes since the moisture content most likely would need to be reduced prior to forming the product.

When clay ceramic is provided for brickmaking, a stockpile is formed. While the material is stored in the stockpile, it may be periodically misted with the oxidizing solution, and then mechanically blended. The blending allows for good distribution of the oxidizing solution.

The clay ceramic may be stored in a reclaimer, a device that produces a long stockpile by adding new raw material sequentially along the length of the pile achieving a "layering" action. On withdrawal, buckets skimming along the surface of the stockpile remove layered material allowing for a homogenization of raw materials. In one embodiments of this invention, the clay is wet with oxidizing solution just before it is added to the reclaimer taking advantage of the dwell period in the reclaimer for oxidation to take place within the stockpile.

In one embodiment of the invention, clay may be passed through a rotary drum, fluidized bed or similar device. A small quantity of oxidizing solution may be added to the material during the grinding and sizing stage as the material is transported on a belt. Application of the oxidizing material usually is most effective after the clay has been through the grinding step. The ground material reveals more surface exposed, which makes it easier for the oxidizing solution to reach the pyrite. After exiting the crusher or grinder, the material may be carried in a thin layer on a belt as it is transported through the system. The material can be treated with oxidizer during transport on the belt. The subsequent sizing stage facilitates mixing of the oxidizing solution with raw material.

An oxidizing solution also may be added during the mixing stage, which facilitates good mixing of the peroxide solution or other oxidizing agent. The oxidation then takes place in the mixing, through the forming and continues well into the decoration and drying stages as well.

For processes where slips (clay/water suspensions) are used, the oxidizing solution may be added to the slip. Such processes include slip casting, spray drying and ceramic-tile making processes. The agitation of the slip ensures good mixing.

EXAMPLE

Peroxide Treatment on Tennessee Shale Rich in Pyrite

In this Example, a natural Tennessee shale containing both sulfide and sulfate was treated with a hydrogen peroxide solution. For the laboratory example, a representative sample of the shale was milled to −200 mesh and mixed in a 1:1 ratio with a solution of 3% hydrogen peroxide (balance water). The solution of shale/peroxide was stirred for 1 hour and then the solution was dried. The resultant treated shale was deagglomerated and then formed into a pellet for analysis.

An untreated and treated sample were heated separately in a Netzsch Simultaneous Thermal Analyzer (STA 449C) to measure the weight change on heating. The gasses generated during heating were conducted to a Fourier Transform Infrared Spectrometer (FTIR—Bruker Vector 22 with TG/IR gas cell attachment) for analysis. This type of analysis provides for the differentiation of species that may result from a particular decomposition.

FIG. 1 shows the emission trace for $SO_2$ gas as a function of temperature for the treated and untreated samples. The $SO_2$ trace for the untreated sample shows a low temperature emission due to sulfide oxidation, and a higher temperature emission due to sulfate decomposition. As can be seen, the treated sample shows the elimination of the emission peak while the sulfate decomposition peak is similar to the untreated sample. Thus, treatment has the effect of reducing the overall quantity of $SO_2$ emission because the emission due to sulfide oxidation has been effectively removed, while the emission due to sulfate decomposition was largely unaffected.

The quantity of $SO_2$ emission due to the oxidation of sulfide (pyrite) has been substantially reduced without a significant increase in the $SO_2$ emission due a to the decomposition of sulfates. This indicates that the pyrite was oxidized prior to firing and most likely occurred either while being stirred with peroxide solution or during the subsequent drying phase. The substantial reduction or elimination of the $SO_2$ emission in the practice of the invention, due to pyrite oxidation, facilitates faster preheat schedules in the kiln which permit faster processing times. This results in less retained sulfur in the body that can result in efflorescence, and improved clay ceramic products with less defects.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A method of treating clay ceramic materials, comprising:
   (a) providing a clay ceramic material, said clay material being comprised of particles having a particle size, said clay material having pyrite therein;
   (b) reducing the particle size of the particles of clay ceramic material;
   (c) mixing the clay ceramic material with an oxidizer, thereby dispersing the oxidizer within the clay ceramic material;
   (d) shaping the clay ceramic material into products;
   (e) heating the products to oxidize the pyrite, thereby removing sulfur-containing compounds from said products.

2. The method of claim 1 wherein the products are selected from the group of products consisting of: bricks, wall tile, roofing tile, and pottery.

3. The method of claim 1 wherein the oxidizer is selected from one or more of the following: barium nitrate, potassium nitrate, sodium nitrate, potassium chlorate, ammonium perchlorate, magnesium perchlorate, calcium hypochlorite, sodium chlorite, hydrogen peroxide, barium peroxide, sodium peroxide, sodium percarbonate, sodium perborate, lithium aluminum hydride, calcium hydride, sodium hydride, organic acids, citric acid, ammonium phosphate, borax, and ozone.

4. The method of claim 3 wherein the oxidizer comprises hydrogen peroxide.

5. The method of claim 3 in which the removed sulfur-containing compounds comprise sulfur dioxide.

6. The method of claim 1 in which the step of mixing the clay ceramic material with an oxidizer is followed by a step of aging the clay in air.

7. A method of producing products from pyrite-containing clay ceramic by mixing the clay ceramic with an oxidizing solution prior to heating the clay ceramic, the steps of the method comprising:
   (a) providing a clay ceramic comprising pyrite;
   (b) mixing the clay ceramic with an oxidizing solution;
   (c) dispersing the oxidizing solution within the clay ceramic;
   (d) pre-oxidizing the pyrite;
   (e) shaping the clay ceramic into products; and
   (f) heating the products to further oxidize the pyrite.

8. The method of claim 7 in which the heating step (f) occurs at a temperature of between about 900 and 1300 degrees Centigrade.

9. The method of claim 7 in which the clay ceramic employed is selected from the group consisting of: kaolin, ball clay, shale, illite, and montmorillonite.

10. The method of claim 7 in which the products are selected from the group of products consisting of: brick, wall tile, roofing tile, and pottery.

11. The method of claim 7 wherein the heating step (f) emits sulfur dioxide gases, further wherein the total amount of emission of sulfur dioxide gases during heating is reduced by the use of the mixing step.

12. The method of claim 7 wherein the time required to complete the firing step is reduced by the pre-oxidizing step.

13. The method of claim 7 wherein the oxidizing solution is a solution having at least one material within said solution selected from the group consisting of: barium nitrate, potassium nitrate, sodium nitrate, potassium chlorate, ammonium perchlorate, magnesium perchlorate, calcium hypochlorite, sodium chlorite, hydrogen peroxide, barium peroxide, sodium peroxide, sodium percarbonate, sodium perborate, lithium aluminum hydride, calcium hydride, sodium hydride, organic acids, citric acid, ammonium phosphate, borax, and ozone.

14. The method of claim 7 wherein said oxidizing solution comprises a solution of hydrogen peroxide.

15. The method of claim 14 wherein the hydrogen peroxide is provided in solution at a concentration of between about 1% and 7% hydrogen peroxide by weight.

16. The method of claim 14 wherein the solution is about 3% hydrogen peroxide by weight.

17. The method of claim 14 in which the ratio of clay ceramic to hydrogen peroxide solution is about 1 part clay ceramic to 1 part hydrogen peroxide solution, by weight.

18. A method of producing fired bricks from clay ceramic by preoxidizing the clay ceramic prior to firing the clay ceramic, the method being adapted for producing fired bricks that have been oxidized to remove sulfur impurities, the method comprising the steps of:
   (a) providing a clay ceramic containing $FeS_2$;
   (b) mixing the clay ceramic with a hydrogen peroxide solution to disperse the hydrogen peroxide solution within the clay ceramic;
   (c) pre-oxidizing the $FeS_2$ in the clay ceramic;
   (d) forming bricks from the clay ceramic; and
   (e) firing the bricks to further oxidize the bricks, thereby releasing $SO_2$ emissions.

19. The method of claim 18 in which the $SO_2$ emissions are minimized in part due to the pre-oxidizing step.

20. The method of claim 18 in which the time required to complete the firing step is reduced due to the pre-oxidizing step.

\* \* \* \* \*